United States Patent [19]

Gerrits

[11] 4,161,858
[45] Jul. 24, 1979

[54] GANG MOWER

[75] Inventor: Theodorus P. H. Gerrits, Wychen, Netherlands

[73] Assignee: Brouwer Turf Equipment Limited, Keswick, Canada

[21] Appl. No.: 867,867

[22] Filed: Jan. 9, 1978

[51] Int. Cl.² ............................................ A01D 75/30
[52] U.S. Cl. .................................... 56/7; 56/DIG. 10
[58] Field of Search ................ 56/6, 7, DIG. 10, 15.8

[56] References Cited

U.S. PATENT DOCUMENTS

| 2,104,719 | 1/1938 | Pol et al. | 56/7 |
| 2,764,864 | 10/1956 | Kinkead | 56/7 |
| 3,910,016 | 10/1975 | Shiia | 56/7 |

FOREIGN PATENT DOCUMENTS 1193656  11/1959  France ............................. 56/DIG. 10

*Primary Examiner*—Louis G. Mancene
*Assistant Examiner*—Paul J. Hirsch
*Attorney, Agent, or Firm*—Rogers, Bereskin & Parr

[57] ABSTRACT

A gang mower having a main frame and a number of individual mower units connected to the main frame. Each mower unit has a pulley driven by a drive belt which extends to a pulley on the main frame, to drive the mower unit reel. A telescopic arm is rigidly connected to the mower unit, extends between the flights of the belts, and is pivotally connected to the main frame between the pulleys. A support strut extends from the telescopic arm to the outer end of the mower unit frame to help align the mower unit. A rear support arm extends laterally from the rear of the mower unit to the main frame to guide the rear end of the mower unit while allowing it to rise and fall. A bias spring exerts downward pressure on the rear support arm to counteract the lifting torque of the drive belt, thereby ensuring that the mower unit will cut at the same height at each of its sides.

6 Claims, 9 Drawing Figures

GANG MOWER

This invention relates to a power driven gang mower, in which a number of individual mower units are mounted on and powered from a main frame.

Power driven gang mowers usually includes a main frame which is supported on its own wheels and which is pulled by a tractor. A number of individual mower units are normally connected to the frame and are driven by a drive mechanism which is mounted on the frame and is connected to the power take-off shaft of the tractor. The mower units extend horizontally when in use, but when they are not in use, they normally must be swung to an upright position so that the gang mower can be driven along roads and through narrow openings such as gates, and so that the mower units will not be damaged by stones and the like. Examples of gang mowers in which the mower units may be swung upwardly in this manner are shown in U.S. Pat. Nos. 2,104,719 and 2,764,864.

A difficulty that has been experienced in prior gang mowers of this kind is that the individual mower units have not rolled evenly over the grass which they are supposed to cut. It is essential in operating a mower that both sides of the mower contact the ground; otherwise one side of the mower will cut high. In areas such as sod farms, golf courses, and the like where accurate control of the grass height is important, such uneven cutting results in an undesirable appearance and requires more frequent recutting, which is expensive. In addition, difficulty has been experienced in the past in ensuring that the mower units travelled precisely parallel with the path of travel of the tractor, rather than being dragged slightly sideways, which tended to damage fragile or wet turf.

The applicant has determined that a major cause of the uneven cutting or prior art gang mower units was that the torque applied to the pulley used to drive each mower unit tended to lift the inner end of the unit. Adjustment of the height of the inner end of the unit did not solve the problem. Accordingly, the applicant has provided a special rear link and spring mechanism which counteracts this torque and which helps to ensure that the mower unit will remain flat as it is towed. In addition, the present invention provides an improved telescopic tube and strut arrangement to ensure that the mower unit is towed precisely in the desired direction by the tractor. In a preferred embodiment of the invention, the telescopic tube and strut arrangement has the additional advantage of providing improved tension on the drive belt for the mower unit and also is arranged to facilitate replacement of the drive belt.

Further objects and advantages of the invention will appear from the following description, taken together with the accompanying drawings, in which.

Figure 1:
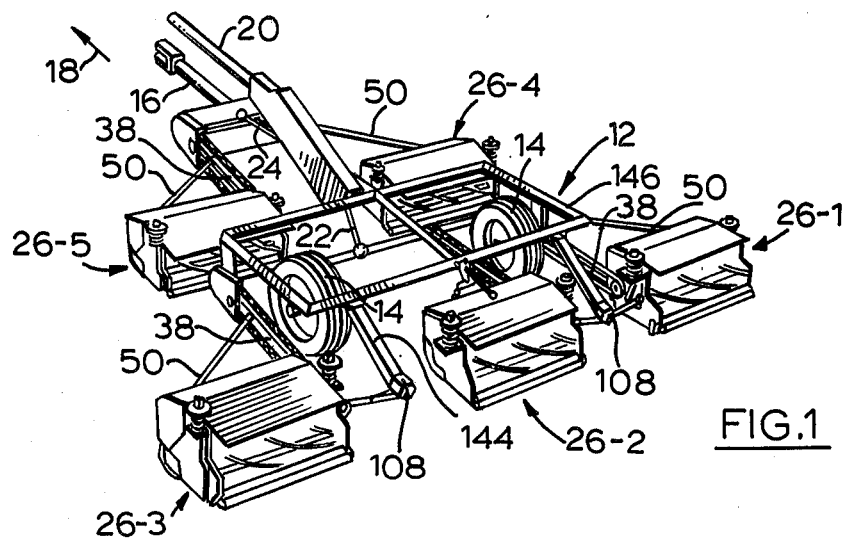
FIG. 1 is a perspective diagrammatic view showing the overall arrangement of a gang mower according to the invention.

Reference is first made to FIG. 1, which shows, somewhat diagrammatically, the general organization of the gang mower of the invention. The gang mower of FIG. 1 includes a main frame generally indicated at 12, supported by wheels 14. The main frame 12 has a draw bar 16 adapted to be connected to a tractor (not shown) which propels the mower along a path of travel indicated by arrow 18. A drive shaft 20 is provided, which can be connected to the power take-off shaft of the tractor and which is connected by shafts 22, 24 to the pulleys (to be described) which drive the mower units.

Supported on the main frame 12 are five individual mower units 26-1, 26-2, 26-3, 26-4, 26-5. The mower units are all identical, except for the side on which they are driven, and only unit 26-1 will be described. The mower unit 26-1 has a cutting reel 28 (FIGS. 2, 3) which is power driven within the mower unit frame to rotate, in the direction of arrow 30, against a bed knife 32 to cut grass. The rear of the mower unit 26-1 is supported by a conventional roller 36. As is conventional, the depth of cut at each side of the mower unit is controlled by adjusting the height of the roller 36 in its mountings. The rear of the mower unit is supported by a telescopic mounting arm 38 to be described. Skids 39 are provided, one at each side of the mower and do not normally contact the ground but are provided to protect the bed knife 32 in case the mower unit encounters bumps or irregularities in the ground.

Figure 3:
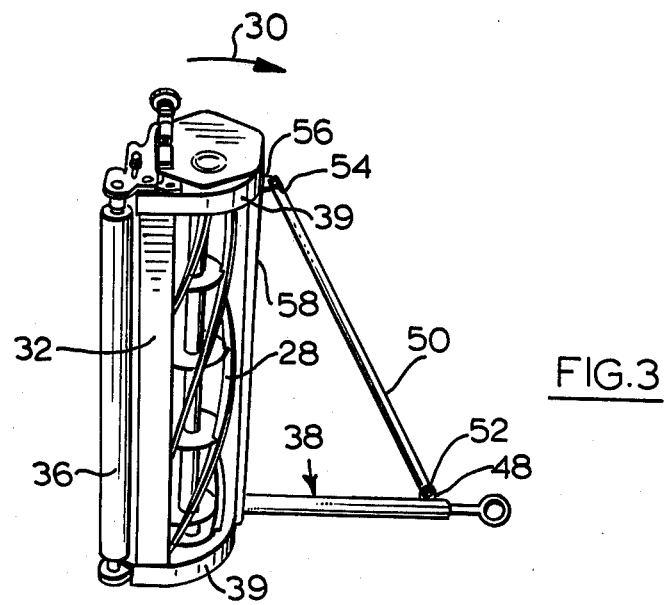
FIG. 3 is a perspective view of a mower unit which has been swung upwardly and showing the bottom of the mower unit.
Figure 5:
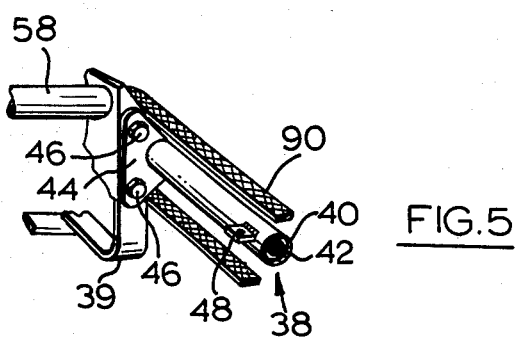
FIG. 5 is a perspective view showing in more detail the connection of the arm of FIG. 4 to the mower unit frame.
Figure 4:
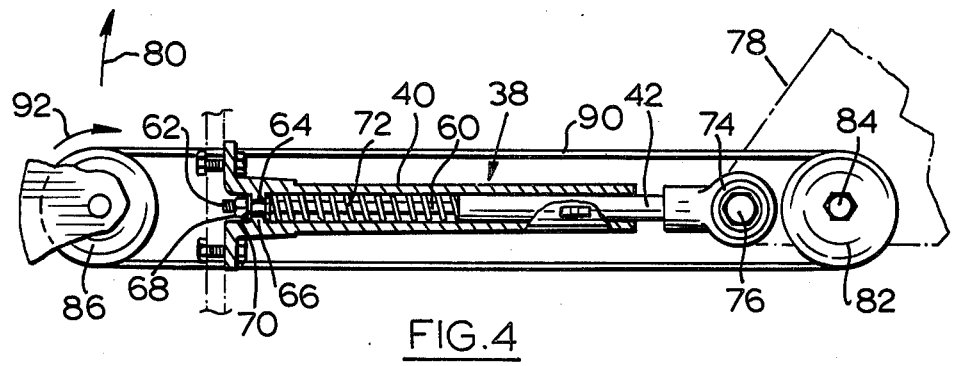
FIG. 4 is a side view, partly in section, of a telescopic arm connecting a mower unit to the main frame.

The mower unit 26-1 is mounted as follows. A telescopic front mounting arm 38 (FIGS. 3, 4, 5) is provided, comprising a rear outer tube 40 and an inner front tube 42. The rear outer tube 40 includes a generally triangular enlargement 44 formed at its rear (see particularly FIG. 5). The enlargement 44 is secured by bolts 46 to the front of the inner skid 34, thereby securing the rear of the outer tube 40 to the mower unit 26-1.

The front of the outer tube 40 includes a short outwardly facing side projection 48 welded thereto. A strut 50 is secured to the projection 48 by a bolt 52. The strut 50 extends to the outer end of the mower unit and is bolted at 54 to a projection 56 from the outer end of the top frame member 58 of the mower unit. This prevents excessive lateral bending faces in the telescopic arm 38 which would otherwise occur due to drag or impact at the outer end of the mower unit.

The inner front tube 42 comprises a narrow elongated rod 60 extending axially therefrom. The rod 60 is typically secured to the inner tube 42 by being screwed into it. The free end of the rod 60 is threaded at 62 and extends through a hole 64 in an interior wall 66 adjacent the rear end of the outer tube 40. A nut 68 and washer 70 are secured to the threaded end 62 of the rod 60. It will be seen that the inner tube 42 can move telescopically within the outer tube 40, but movement to the right (i.e. to the front) is limited by the nut 62. This prevents separation of the parts in case of belt breakage.

Movement of the inner tube 42 to the left or rear is limited by a coil spring 72 which encircles the rod 60 and biases the inner tube 42 to the right.

A bearing 74 is secured to the free end of the inner tube 40. The bearing 74 is mounted by a bolt 76 on a plate 78 which forms part of the main frame 12 of the gang mower. As shown, the entire telescopic arm 38 (and hence the entire mower unit) can pivot as indicated by arrow 80 about the bolt 76.

Power is supplied as follows to the reel 28 of the mower unit 26-1. A pulley 82 (FIG. 4) is mounted on the plate 78, immediately ahead of the front end of the telescopic arm 38. The pulley 82 is laterally aligned with the arm 38 and is held to the plate 78 by a bolt 84. A rear pulley 86 is mounted on the inner side of the mower unit, behind the rear end of the arm 40 and is also aligned laterally with the arm 38. The rear pulley 86 is connected to the shaft 88 of the reel 28 to drive the reel. A flexible rubber belt 90 extends between the pulleys and moves in the direction of arrow 92, to turn the reel.

Since the telescopic arm 38 is positioned along the longitudinal axis of belt 90, between the upper and lower flights of the belt, the coil spring 72 serves to tension the belt. In addition, the entire telescopic arm 38, including its front mounting, is protected by the moving belt against accumulation of grass clippings (which otherwise would build up on this arm and then fall off in clumps). It will also be seen that because the inner tube 42 is free to rotate about its axis within the outer tube 40, the entire mower unit 26-1 can pivot as a unit about the axis of the telescopic arm 38, as indicated by arrow 94 in FIG. 2.

Figure 2:
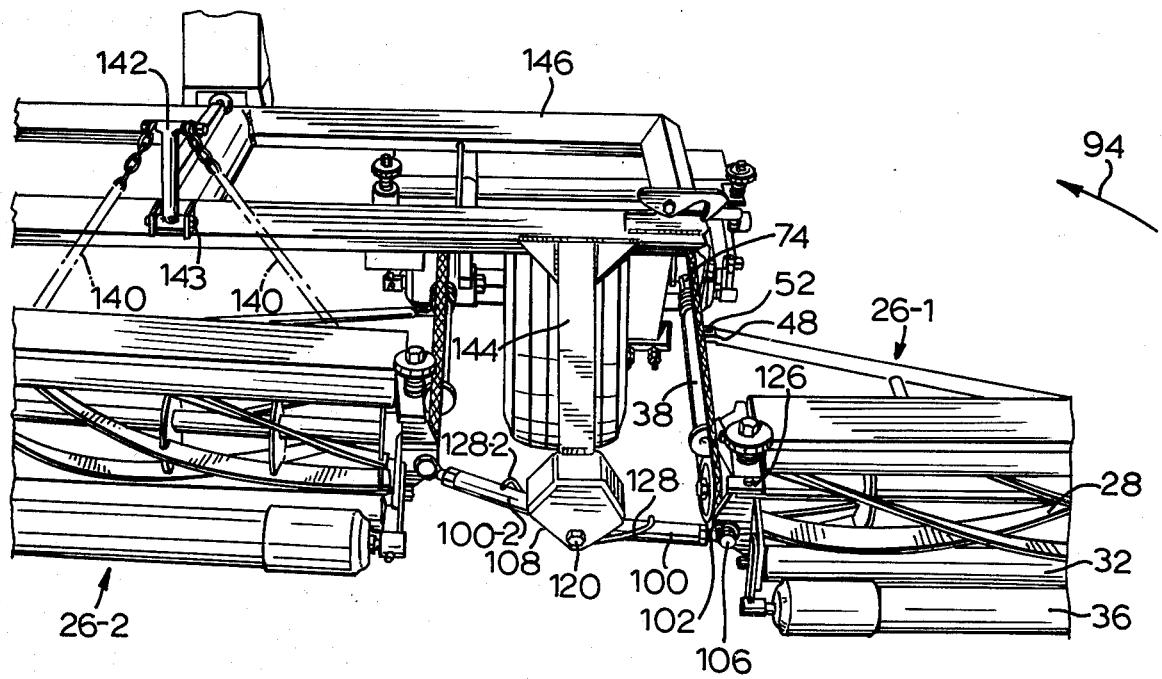
FIG. 2 is a rear perspective view showing a portion of a main frame and of two mower units according to the invention.
Figure 6:
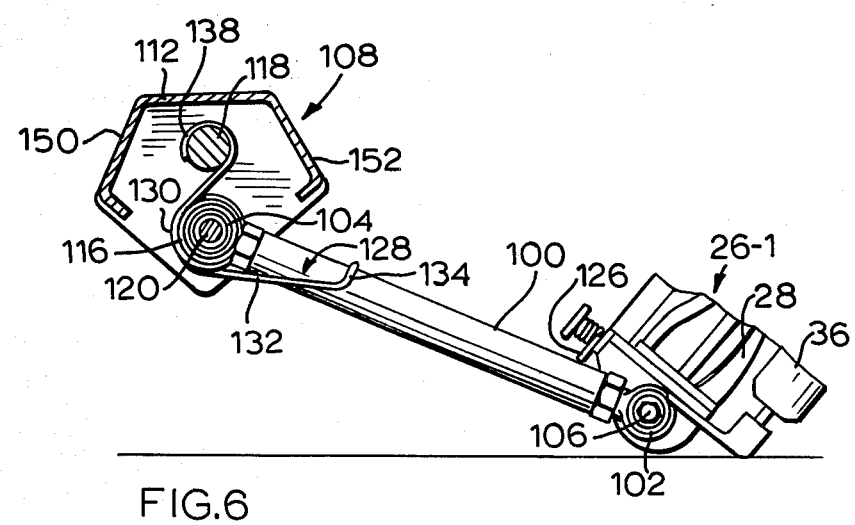
FIG. 6 is a side view showing a rear arm connecting the rear of a mower unit to the main frame.
Figure 7:
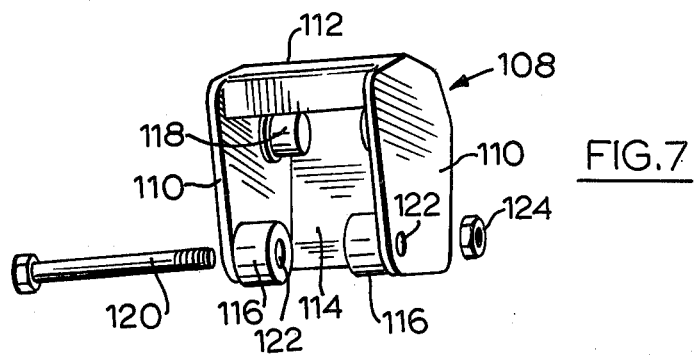
FIG. 7 is a perspective view showing a housing for the rear arm of FIG. 6.

The rear of the mower unit is held to the mower by a rear arm 100 (FIGS. 2, 6). The rear arm 100 is a conventional cylindrical member fitted with bearings 102, 104 at its ends. The bearings 102, 104 are spherical bearings, to permit movement in an upward and downward arc and also in a forward and backward arc. One bearing 102 is secured to the inner side of the mower unit 26-1, behind the pulley 86, by a bolt 106. The other rear arm bearing 104 is mounted in a rear arm housing 108 shown separately in FIG. 7. The rear arm housing 108 has a pair of side walls 110 and a top wall 112 which define an interior downwardly facing opening 114. Projecting from the side walls 110 are two pairs of inwardly facing opposed spaced bosses 116, 118, the pair 118 being located above the pair 116. A bolt 120 extends through aligned apertures 122 in the lower bosses 116 and is secured in position by a nut 124. The bolt 120 extends through the end bearing 102 of the rear arm 100 and forms a pivotal connection for the rear arm 100. This permits the inner end of the mower unit 26-1 to rise and fall so as to follow the contours of the ground over which it travels, and at the same time the rear arm 100 guides the rear end of the mower unit.

When the mower unit 26-1 is swung upwardly, as shown in FIG. 6, a stop 126 secured to the inner top edge of the mower unit contacts the side of the rear arm 100 (as shown in FIG. 6). At this stage, further pivotal movement of the mower unit about the bolt 106 is prevented, and the entire mower unit then pivots about the inner bolt 120 until it is raised clear of the ground. The mower unit may then be latched in position by means not shown.

In operation, as the mower reel is turned by the belt 90, it is found that the pull of the upper flight of the belt 90 tends to lift the inner end of the mower unit. As previously indicated, this causes uneven cutting by the mower unit. It is extremely difficult to compensate for this by adjustment of the height of the inner end of the mower unit, because the lifting force varies as the mower unit is started and may even depend on factors such as the amount of resistance offered to the reel by the grass which is being cut.

Figure 8:
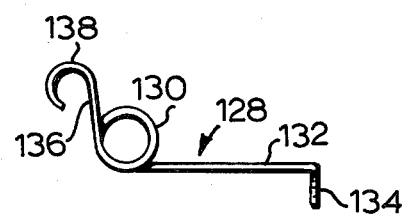
FIG. 8 is a side view of a spring used to bias the rear arm of FIG. 6 downwardly.

To solve this problem, a spring 128 (FIGS. 2, 6 and 8) is provided. The spring 128 includes a central coil section 130, a first elongated arm 132 with a hook 134 at its free end, and a second shorter arm 136 with a hook 138 at its free end. The central coil 130 of the spring normally encircles one of the lower bosses 116; the elongated arm 132 extends along the rear arm 100 and hooks thereover, and the shorter arm 136 extends upwardly to an upper boss 118 and hooks thereover. The hook 138 will normally remain in position over the upper boss 118 without any special fastening means being required.

In an operative prototype of the invention, the spring 128 was arranged to provide a downward pressure on the arm 100 of about 20 pounds. It was found that this was sufficient to counteract the lifting force created by the belt 90 under normal operating conditions, and the force of the spring 128 caused the mower unit to remain flat and to cut evenly without difficulty. The spring tension may be made adjustable if desired.

Figure 9:
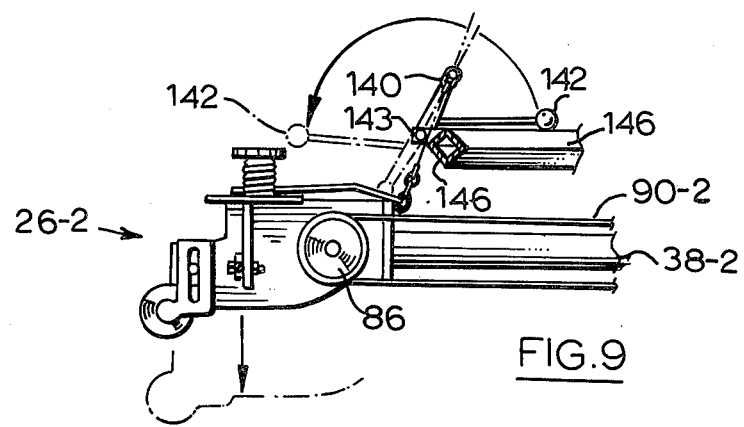
FIG. 9 is a side view, partly in section, showing a mower unit being lifted upwardly to inoperative position.

The centre rear mower unit 26-2 (FIG. 1) is mounted in the same manner as the other mower units, and its rear arm 100-2 also is pivotally mounted on bolt 120. Its bias spring 128-2 has its central coil mounted over the second lower boss 116 in housing 108, and its shorter arm hooks over the second upper boss in housing 108. The mower unit 26-2 is typically lifted simply by being pulled upwardly by chains 140 secured to each end of the mower unit frame and connected to a handle 142 pivotted at 143 to the main frame. When the handle 142 is moved as diagrammatically indicated in FIG. 2, the mower unit 26-2 is pivotted upwardly about its bolt 84 to the solid line position shown in FIG. 9.

The design of the housing 108 reduces the likelihood of grass clippings accumulating thereon. It will be seen that the sides 150, 152 of the top wall 112 of housing 108 are each downwardly sloping, to shed grass clippings and also to protect the bearings at the inner ends of the arms 100 from accumulating clippings. The upper part of the top wall 112 of the housing 108 is flat but is sheltered from clippings by the rearwardly and downwardly sloping support arm 144 which extends from the box frame 146 of the main frame and supports the housing 108. The downward slope of arm 144 reduces buildings of clippings on that arm. It will also be seen that the box frame 146 is formed of square tubing having its corners pointed upwardly, so that the sloping sides of the box frame 146 will shed clippings.

Because of the front pivot or bolt 84 of the telescopic arm 38 is spaced behind the front pulley 82 (FIG. 4), changing drive belts for the mower units is facilitated. When a belt is to be changed, its upper flight is pulled upwardly to compress the telescopic tube 38. A double ended hook is then placed between any convenient pair of points at the mower unit end and the main frame end of the tube 38 to hold the tube compressed. The belt is then released and may be easily changed since the distance between the pulley 82, 86 has been shortened.

An advantage of the construction shown is that the mower units, particularly the mower units 26-1, 26-3, 26-4, 26-5 which are being pulled outboard of the main frame 12, do not require wheels. This is because the mower units are supported partly by their rollers and partly by the telescopic tubes 38. The absence of wheels reduces the uncut areas which otherwise often result when the wheels of mower units flatten the grass ahead of the mower reels. Although the main frame 12 does have wheels 14, the mower units 26-4 and 26-5 are positioned ahead of these wheels, to cut the grass before the grass is flattened by the wheels 14. It is found that the telescopic arm 38, together with the reel 50, provides enough support in the outboard towed mower units so that wheels in the units are not required.

What I claim as my invention is:

1. A mower having
   (1) a wheel supported main frame for movement along a path of travel,
   (2) a mower unit having a mower reel for cutting grass, said mower unit having a mower frame having an inner side located adjacent said main frame and an outer side located remote from said main frame,
   (3) a first pulley mounted on said mower frame at the inner side thereof for driving said reel,
   (4) a second pulley mounted on said main frame for driving said first pulley, said second pulley being spaced along said path of travel from said first pulley, and a flexible belt extending between said pulleys, said belt having upper and lower flights,
   (5) means for driving said second pulley so that said upper flight moves from said first pulley toward said second pulley,
   (6) a telescopic connecting arm extending along the longitudinal axis of said belt between the flights thereof, said connecting member having an outer tubular member having first and second ends, said first end being rigidly connected to said mower frame, said arm also having an inner tubular member having a first end telescopically mounted within said second end of said outer member and having a second end pivotally connected to said main frame at a first pivotal connection, the axis of said first pivotal connection being at right angles to said path of travel for movement of said mower unit in an arc about said first pivotal connection,
   (7) said inner member being rotatable about its axis within said outer member for rotation of said mower unit about the axis of said inner member,
   (8) spring means connected between said inner and outer tubular members and biasing said inner and outer tubular members apart, and means retaining said inner tubular member within said outer tubular member,
   (9) a support strut connected to said outer side of said mower frame and extending to and connected with said outer tubular member at a location adjacent said second end of said outer tubular member,
   (10) a rear support arm pivotally connected at a second pivotal connection to said inner side of said mower frame and pivotally connected at a third pivotal connection to said main frame, the axes of said second and third pivotal connections both being parallel to said path of travel, whereby to permit up and down movement of the inner side of said mower frame,
   (11) and a rear bias spring connected to said main frame and extending over said rear support arm and biasing said rear support arm downwardly to hold said inner side of said mower frame downwardly against the lifting torque of said belt.

2. A mower according to claim 1 wherein said spring means is positioned within said outer tubular member.

3. A mower according to claim 2 wherein said first pivotal connection comprises a bearing connected to said second end of said inner tubular member, and a pivot pin extending through said bearing and connected to said main frame, said pivot pin being linearly aligned with the axes of said first and second pulleys and being located between said first and second pulleys.

4. A mower according to claim 1, wherein said main frame includes a rear support arm housing having front, rear and upper walls defining an interior downwardly facing opening, a pair of lower inwardly facing opposed bosses mounted one on each of said front and rear walls, a pair of upper opposed inwardly facing bosses spaced above said lower bosses and also located one on each of said front and rear walls, said pairs of bosses being aligned parallel with said path of travel, a second pivot pin extending through said lower bosses, said rear arm being pivotally mounted on said second pivot pin, said rear bias spring including a central coil portion extending around one of said lower bosses, a first arm extending upwardly to and hooked around one of said upper bosses, and a second arm extending along and hooked over said rear support arm.

5. A mower according to claim 1 and having two said mower units, one spaced laterally of the other, a second rear support arm also pivotally mounted on said second pivot pin and pivotally connected to said second mower unit, and a second rear bias spring identical with said first rear bias spring, the first arm of said second rear bias spring being hooked around the other of said upper bosses and the coil portion of said second rear bias spring extending around the other of said lower bosses.

6. A mower according to claim 1 wherein said main frame includes four upper square members joined in a rectangular configuration, one corner of each said members facing upwardly so that the sides of said members slope downwardly, a rear frame arm sloping rearwardly and downwardly from one of said upper members and having a free end, said housing being mounted at said free end of said rear frame arm, said housing having a top wall having downwardly sloping sides, whereby to reduce accumulation of clippings on said main frame and on said housing.

* * * * *